(12) United States Patent
Sakamoto

(10) Patent No.: US 7,196,863 B2
(45) Date of Patent: Mar. 27, 2007

(54) APPARATUS AND METHOD FOR CONTROLLING HEAD UNLOAD OPERATION IN DISK DRIVE

(75) Inventor: Nobuyuki Sakamoto, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/985,873

(22) Filed: Nov. 12, 2004

(65) Prior Publication Data
US 2005/0111133 A1 May 26, 2005

(30) Foreign Application Priority Data
Nov. 20, 2003 (JP) .............................. 2003-391055

(51) Int. Cl.
*G11B 21/02* (2006.01)
(52) U.S. Cl. ...................................................... 360/75
(58) Field of Classification Search ................. 360/75, 360/77.02, 78.04, 78.06, 78.08, 78.09, 97.02, 360/266.4
See application file for complete search history.

(56) References Cited

U.S. PATENT DOCUMENTS

| | | | |
|---|---|---|---|
| 5,325,030 A | | 6/1994 | Yamamura et al. |
| 5,729,399 A | * | 3/1998 | Albrecht et al. ............... 360/75 |
| 5,808,438 A | * | 9/1998 | Jeffrey ......................... 318/634 |
| 6,016,234 A | * | 1/2000 | Blank et al. .................. 360/75 |
| 6,282,049 B1 | * | 8/2001 | Cameron et al. ............. 360/75 |
| 6,392,375 B1 | * | 5/2002 | Portaluri et al. ............. 318/459 |
| 6,396,652 B1 | * | 5/2002 | Kawachi et al. .............. 360/75 |
| 6,563,660 B1 | | 5/2003 | Hirano et al. |
| 6,611,118 B2 | * | 8/2003 | Abe et al. .................... 318/254 |
| 6,631,045 B1 | * | 10/2003 | Pedrazzini ................... 360/75 |
| 6,643,087 B1 | * | 11/2003 | Kuroki et al. ................ 360/75 |

(Continued)

FOREIGN PATENT DOCUMENTS

| | | |
|---|---|---|
| EP | 1 152 16 A2 | 11/2001 |
| GB | 2 026 208 A | 1/1980 |
| JP | 5-49291 | 2/1993 |
| JP | 2001-155450 | 6/2001 |
| JP | 2001-155455 | 6/2001 |

OTHER PUBLICATIONS

Australian Search Report dated Aug. 30, 2005 for Singapore Appln. No. 200406348-3.
People's Republic of China Office Action dated Apr. 7, 2006 for Application No. 200410092374.7.

*Primary Examiner*—Fred F. Tzeng
(74) *Attorney, Agent, or Firm*—Pillsbury Winthrop Shaw Pittman, LLP

(57) ABSTRACT

An actuator supports a head such that the head is movable in a radial direction of a disk. The actuator has a voice coil motor (VCM) used as a driving source for the actuator. A voice coil motor driver (VCM driver) supplies the VCM with a driving current for driving the VCM. During a head unload operation of using the actuator to retract the head to a ramp away from a recording surface of the disk, a driver driving unit drives the VCM driver by a voltage higher than that required for a non-head-unload operation.

3 Claims, 3 Drawing Sheets

U.S. PATENT DOCUMENTS

| | | | |
|---|---|---|---|
| 6,760,178 B2 * | 7/2004 | Shibata | 360/75 |
| 6,765,746 B2 * | 7/2004 | Kusumoto | 360/75 |
| 6,864,656 B2 * | 3/2005 | Abe et al. | 318/560 |
| 6,876,510 B2 * | 4/2005 | Heydt et al. | 360/75 |
| 2001/0024339 A1 | 9/2001 | Yaegashi | |
| 2001/0026414 A1 | 10/2001 | Shibata | |
| 2002/0154438 A1 | 10/2002 | Hirano | |
| 2003/0161065 A1 | 8/2003 | Yatsu | |

* cited by examiner

APPARATUS AND METHOD FOR CONTROLLING HEAD UNLOAD OPERATION IN DISK DRIVE

CROSS-REFERENCE TO RELATED APPLICATIONS

This application is based upon and claims the benefit of priority from prior Japanese Patent Application No. 2003-391055, filed Nov. 20, 2003, the entire contents of which are incorporated herein by reference.

BACKGROUND OF THE INVENTION

1. Field of the Invention

The present invention relates to a disk drive having a head that reads data written on a recording surface of a disk. In particular, the present invention relates to an apparatus and method for controlling a head unload operation in a disk drive, which apparatus and method are suitable for reducing power consumption when the head is unloaded in a particular area away from the recording surface of the disk.

2. Description of the Related Art

Recent disk drives, for example, hard disk drives generally comprise ramps. The ramp provides an area to which a head is retracted. The ramp is located away from a recording surface of a disk. The head is supported by a suspension. The suspension is formed at a tip of an actuator. The actuator moves the head in a radial direction of the disk. The actuator includes a voice coil motor (VCM) that drives the actuator. The voice coil motor includes a magnet (permanent magnet) that produces magnetic fields. A tab is formed at a tip of the suspension. Actually, the tab is retracted to the ramp. However, for simplification, a common description is that the head is retracted to the ramp. An operation of retracting the head to the ramp is called an "unload" (head unload). In contrast, an operation of moving the head from the ramp onto the recording surface is called a "load" (head load).

A torque $T_U$ applied to the actuator during a head unload operation is expressed by:

$$T_U = F_U L1 \quad (1)$$

where $F_U$ denotes a force resulting from the friction between the ramp and the tab during the head unload operation. L1 denotes the distance between the rotation center of the actuator and the tab (that is, the length of an arm of the actuator).

To enable a head unload operation, it is necessary that a torque $T_{VCM}$ generated by the voice coil motor is higher than the torque $T_U$ applied to the actuator during the head unload operation. The torque $T_{VCM}$ is expressed by:

$$T_{VCM} = F_{VCM} L_2 \quad (2)$$

where $F_{VCM}$ denotes a force generated by the voice coil motor. L2 denotes the distance between the rotation center of the actuator and the center of the voice coil motor.

$F_{VCM}$ is expressed by:

$$F_{VCM} = 2BNI_{VCM}L \quad (3)$$

where B denotes the intensity of magnetic fields generated by the magnet of the voice coil motor. N denotes the number of turns in a coil (voice coil) of the voice coil motor. L denotes the effective length of the coil. $I_{VCM}$ denotes a driving current (VCM current) flowing through the voice coil motor.

On the basis of equations (2) and (3), $T_{VCM}$ is expressed by:

$$T_{VCM} = F_{VCM} L_2 = 2BNI_{VCM}LL_2 \quad (4)$$

As is apparent from equation (4), $T_{VCM}$ is proportional to the current $I_{VCM}$. A coefficient for the proportion of $T_{VCM}$ to the current $I_{VCM}$ ($2BNLL_2$) is called a torque constant. Here, the intensity B of electric fields is generally proportional to the thickness of the magnet. In other words, in equation (4), B, L, and $L_2$ are elements relating to the length (device scale). Accordingly, $T_{VCM}$ is proportional to the third power of the length (device scale).

On the other hand, if a suspension load is fixed, $F_U$ is not dependent on the length. Accordingly, $T_U$ expressed by equation (1) is proportional to the first power of the device scale. In this manner, $T_{VCM}$ is proportional to the third power of the device scale, whereas $T_U$ is proportional to the first power of the device scale. Thus, when an attempt is made to reduce the size of the hard disk drive (for example, from 2.5-inch type to 1-inch type), a decrease in $T_{VCM}$ is larger than that in $T_U$. In other words, $T_U$ (the torque applied to the actuator during a head unload operation) is relatively larger than $T_{VCM}$ (the torque generated by the voice coil motor).

As described in, for example, Jpn. Pat. Appln. KOKAI Publication No. 2001-155455, the terminal voltage $E_{VCM}$ of the coil (voice coil) of the voice coil motor (that is, the terminal voltage of the voice coil motor) is expressed by:

$$E_{VCM} = RI_{VCM} + \Delta E \quad (5)$$

where R denotes the resistance of the voice coil. Further, $\Delta E$ represents a back electromotive force voltage (back-EMF-voltage) generated by the voice coil.

The voice coil motor is driven by a motor driver (voice coil motor driver). A power supply voltage (driving voltage) for driving the motor driver is indicated by $E_P$. The difference between $E_P$ and $E_{VCM}$ represents a voltage drop in the motor driver. Consequently, a power loss $P_{LOSS}$ in the motor driver is expressed by:

$$P_{LOSS} = (E_P - E_{VCM})I_{VCM} \quad (6)$$

As is apparent from equation (6), the power loss $P_{LOSS}$ in the motor driver decreases consistently with the difference between $E_P$ and $E_{VCM}$. In general, in a seek operation of moving the head to a target track on the disk, the back-EMF-voltage $\Delta E$ is lower than a voltage drop $RI_{VCM}$ in the coil. Thus, the voice coil of the voice coil motor is designed so that the value of $RI_{VCM}$ during a seek operation nears the power supply voltage $E_P$. This design enables the power loss in the motor driver to be minimized.

As described above, a reduction in the size of the hard disk drive increases the torque $T_U$, applied to the actuator during a head unload operation, relatively to the torque $T_{VCM}$, generated by the voice coil motor. To enable the head unload operation, it is necessary that $T_{VCM}$ is higher than $T_U$. The torque that enables the head unload operation, that is, the torque to be generated by the voice coil motor so as to overcome the torque $T_U$ is called a "torque required for a head unload operation". On the other hand, the torque that enables a seek operation is called a "torque required for a seek operation". The torque required for the seek operation is not significantly affected by a reduction in the size of the hard disk drive. Thus, in a small-sized hard disk drive, the torque required for the head unload operation may be higher than that for the seek operation.

For such a hard disk drive, the voice coil of the voice coil motor must be designed in accordance with the current (VCM current) $I_{VCM}$ required for a seek operation in order to minimize the power loss in the motor driver. However, such a voice coil design may prevent the required VCM current from flowing through the voice coil during a head unload operation. In other words, the voice coil motor cannot generate a torque required for the head unload operation.

Thus, in the prior art, the voice coil of the voice coil motor is designed so as to ensure the torque required for a head unload operation. Specifically, the resistance R of the voice coil is reduced to allow more VCM current to flow through the voice coil during the head unload operation. However, a decrease in the resistance R of the voice coil requires the wire diameter of the coil to be increased to reduce the number of turns in the coil. In this case, the torque constant, that is, the coefficient of proportion ($2BNLL_2$) decreases. In such a state, more VCM current must flow even during a seek operation. This may disadvantageously result in an increase in the power consumption of the motor driver during the seek operation.

Jpn. Pat. Appln. Publication No. 2001-155450 discloses a technique to switch a power supply voltage for the voice coil motor in order to reduce the power loss in the voice coil motor driver. This technique switches the power supply voltage for the voice coil motor between a seek operation and a tracking (following) operation. The seek operation requires much VCM current (torque), whereas the tracking (following) operation requires only a little VCM current (torque). On the other hand, Jpn. Pat. Appln. KOKAI Publication No. 5-49291 discloses a technique to utilize a capacitor in which charges are accumulated as a power supply for a voice coil motor controller while the power supply is interrupted. A voltage boosted by a voltage booster is used to accumulate charges in the capacitor. This technique enables a head unload operation even while the power supply is interrupted.

As described above, the torque $T_U$, applied to the actuator during a head unload operation, is proportional to the length of the arm of the actuator and thus varies in accordance with the first power of the device scale of the hard disk drive. On the other hand, the torque $T_{VCM}$, which can be generated by the voice coil motor, varies in accordance with almost the third power of the device scale. Thus, if the size of the hard disk drive is reduced, the torque $T_U$ increases relatively to the torque $T_{VCM}$. Here, the torque required for a head unload operation is assumed to be larger than that for a seek operation as in the case of a small-sized hard disk drive. In this case, the coil (voice coil motor) of the voice coil motor must be designed so that the voice coil motor can generate the torque required for the head unload operation. However, when the voice coil motor is designed in accordance with the torque required for the head unload operation, the power consumption of the motor driver increases during a seek operation. Further, the seek operation is performed many more times than the head unload operation.

BRIEF SUMMARY OF THE INVENTION

In accordance with an embodiment of the present invention, there is provided a disk drive having a head which reads data written on a recording surface of a disk. The disk drive is composed of an actuator, a voice coil motor driver, and a driver driving unit. The actuator supports the head such that the head is movable in a radial direction of the disk. The actuator has a voice coil motor used as a driving source for the actuator. The voice coil motor driver supplies the voice coil motor with a driving current for driving the voice coil motor. The driver driving unit is configured to drive, during a head unload operation, the voice coil motor driver by a voltage higher than that required for a non-head-unload operation. The head unload operation uses the actuator to retract the head to a retract area away from the recording surface of the disk.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
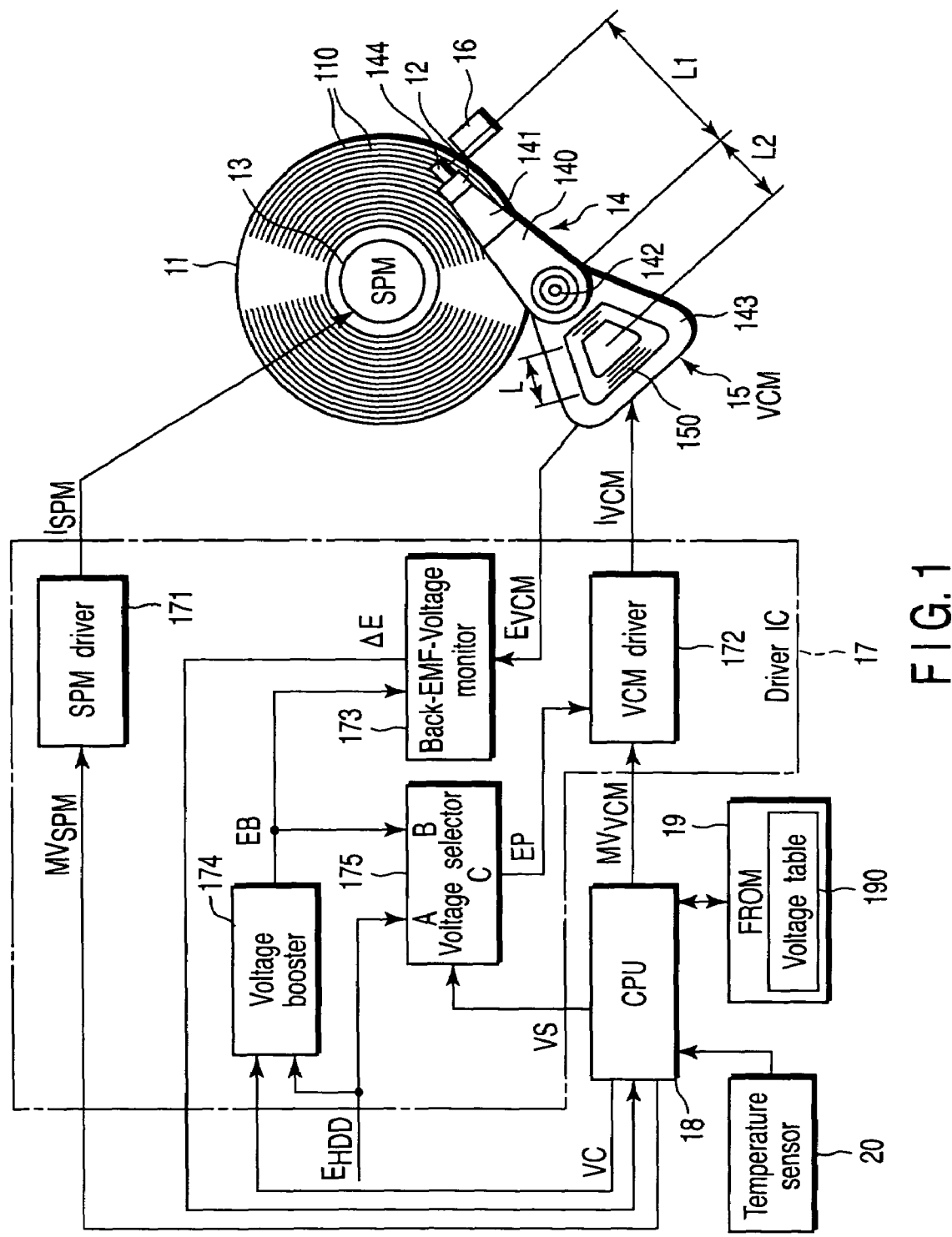
FIG. 1 is a block diagram showing the configuration of a hard disk drive according to an embodiment of the present invention.

With reference to the drawings, description will be given of an embodiment in which the present invention is applied to a hard disk drive. FIG. 1 is a block diagram showing the configuration of a hard disk drive according to an embodiment of the present invention. In FIG. 1, a disk (magnetic disk) has two disk surfaces, an upper surface and a lower surface. At least one of the disk surfaces of the disk 11 serves as a recording surface on which data is magnetically recorded. A large number of concentric tracks 110 are formed on the recording surface of the disk 11. Further, servo information is pre-written (pre-embedded) in each of the tracks 110 discretely at regular intervals. The servo information contains positional information (cylinder codes) indicative of the positions of cylinders (tracks) on the disk 11 in which the servo information has been written. A head (magnetic head) is placed in association with the recording surface of the disk 11. The head 12 is used to read and write data from and to the disk 11. It is assumed in the configuration shown in FIG. 1 that the hard disk drive includes a single disk; however, the drive may have a plurality of disks 11 that are stacked on one another.

The disk 11 is rotated at high speed by a spindle motor (SPM) 13. The head is attached to an actuator (carriage) 14. More specifically, the head 12 is attached to a suspension 141 extending from an arm 140 of the actuator 140. The head 12 moves in the direction of the radius of the disk 11 in accordance with the rotation of the actuator 14. Thus, the head 12 is positioned on the target track. The actuator 14 includes a voice coil motor (VCM) 15 serving as a driving source of the actuator 14. The actuator 14 is driven by the VCM 15.

The disk 11 has an inner periphery and an outer periphery. A ramp 16 is placed in proximity to the disk 11, for example, to the outer periphery of the disk 11. The ramp 16 may be placed in proximity to the inner periphery of the disk 11. The ramp 16 is used to retract the head 12 to an area away from the recording surface of the disk 11 while the hard disk drive is in a power save mode. However, actually, a tab 144 is located on the ramp 16 instead of the head 12. Thus, the ramp 16 is placed at a predetermined position on a path along which the tab 144 is moved. Here, the description that the head 12 is unloaded on the ramp 16 will be used in order to avoid complicated expressions. On the other hand, while the hard disk drive is in a read/write mode, the head 12 is present on the disk 11. The read/write mode is a non-power-save mode in which data can be immediately read from or written to the disk 11. Depending on the type of hard disk drive, a plurality of power save modes may be defined in accordance with the level at which the power consumption is saved. The plurality of power save modes may include one in which the head 12 is present on the disk 11. Thus, in the present embodiment, two modes are defined as the modes of the hard disk drive; in a first mode, the head 12 is retracted to the ramp 16, and in a second mode, the head 12 is present on the disk 11.

A through-hole is formed in an almost central portion of the actuator 14. A pivot 142 is fitted into the through-hole in the actuator 14. The actuator 14 is supported rotatably around the pivot 142. The actuator 14 has a support frame 143 extending in a direction opposite to that in which the arm 141 extends. A voice coil 150 is integrally embedded in the support frame 143. The voice coil 150 is located between a top yoke and a bottom yoke. The voice coil 150, together with both yokes and a permanent magnet fixed to bottom yoke, constitutes the VCM 15.

The SPM 13 and the VCM 15 are driven by a driver IC 17. The driver IC 17 is formed of single chip. The driver IC 17 includes an SPM driver 171, a VCM driver 172, a back-EMF-voltage monitor 173, a voltage booster 174, and a voltage selector 175. The SPM driver 171 supplies the SPM 13 with a driving current $I_{SPM}$ corresponding to a manipulated variable $MV_{SPM}$ provided by the CPU 18. The VCM driver 172 supplies the VCM 15 with a driving current $I_{VCM}$ corresponding to a manipulated variable $MV_{VCM}$ provided by the CPU 18. The back-EMF-voltage monitor 173 indirectly detects a back-EMF-voltage ΔE generated by the coil 150, on the basis of the terminal voltage of the voice coil 150 of the VCM 15 (VCM terminal voltage) $E_{VCM}$. The voltage booster 174 boosts a power supply voltage $E_{HDD}$ for the hard disk drive to a voltage $E_B$ specified by the CPU 18. The voltage $E_B$ is used as a power supply voltage for the back-EMF-voltage monitor 173. The voltage $E_B$ is also used as a power supply voltage (driving voltage) $E_P$ for the VCM driver 172 during a head unload operation. The voltage selector 175 selects one of the voltages $E_{HDD}$ and $E_B$ as the voltage $E_P$ under the control of the CPU 18.

The CPU 18 is a main controller for the hard disk drive. CPU 18 is connected to a flash ROM (FROM) 19 and a temperature sensor 20. The flash ROM 19 is a rewritable nonvolatile memory. The flash ROM 19 is used to store a control program executed by the CPU 18. The flash ROM 19 is also used to store a voltage table 190 referenced by the CPU 18.

Figures 2, 4:
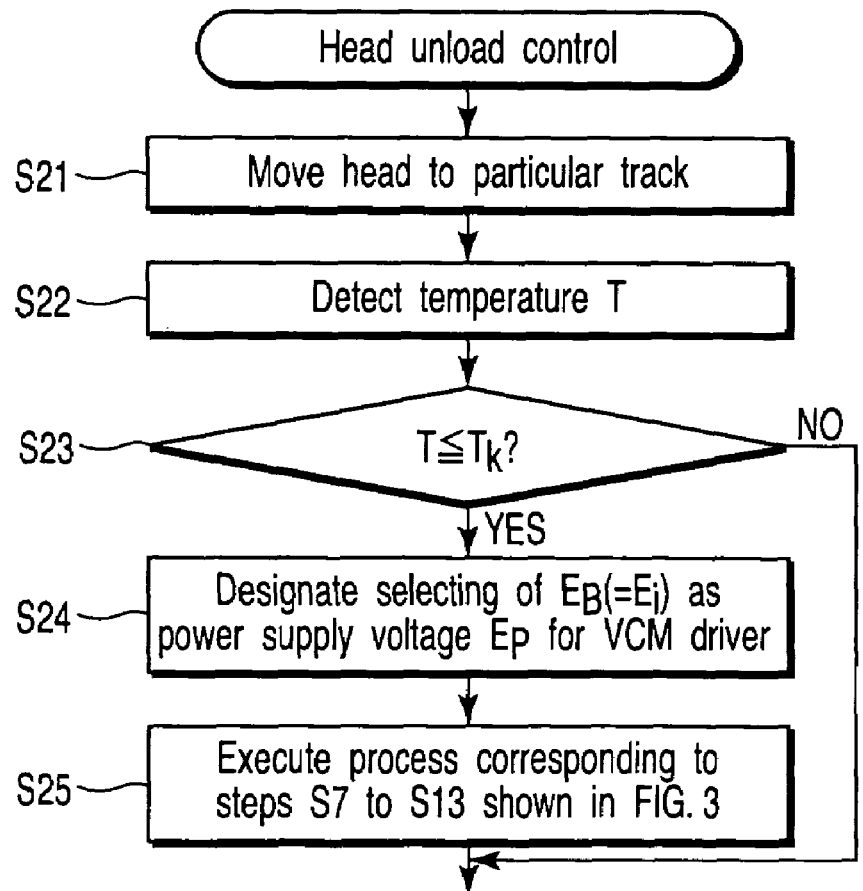
FIG. 2 is a table showing an example of the structure of data in a voltage table 190 shown in FIG. 1.
FIG. 4 is a flowchart showing a procedure of head unload control according to a modification of the embodiment.

The voltage table 190 retains information on a power supply voltage for the VCM driver 172 required for a head unload operation, in association with temperature. FIG. 2 shows an example of the structure of data in the voltage table 190. In FIG. 2, a voltage $E_i$ associated with a temperature $T_i$ (i=1, 2, ... n) indicates a power supply voltage for the VCM driver 172 required for a head unload operation if the environmental temperature T of the hard disk drive is $T_{i-1}<T \leq T_i$. The range of temperature indicated by $T_{i-1}<T \leq T_i$ is denoted by $TR_i$. $T_{i-1}$ where i=1, that is, $T_0$, indicates a lower limit temperature ensuring the operation of the hard disk drive. $T_i$ where i=n, that is, $T_n$, indicates an upper limit temperature ensuring the operation of the hard disk drive. In the present embodiment, if the temperature T is lower than $T_0$, the CPU 18 treats the temperature T as $T_0$. If the temperature T is higher than $T_n$, the CPU 18 treats the temperature T as $T_n$.

The voltage $E_i$ for each temperature $T_i$ shown in the voltage table 190 depends on the torque $T_U$ applied to the actuator 14 during a head unload operation. As is apparent from equation (1), previously described, the torque $T_U$ depends on a force $F_U$ resulting from the friction between the tab 144 of the actuator 14 and the ramp 16. The $F_U$ varies with the temperature and increases consistently with decreasing temperature. That is, the torque $T_U$ depends on the temperature and increases consistently with decreasing temperature. Accordingly, a torque $T_{UN}$ required for a head unload operation increases consistently with decreasing temperature. Here, the torque $T_{UN}$ required for the head unload operation at the temperature $T_i$ is denoted by $T_{UNi}$. The voltage $E_i$ for each temperature $T_i$ is determined by a driving current (VCM driving current) $I_{VCMi}$ to be supplied to the voice coil 150 of the VCM 15. The $I_{VCMi}$ is a driving current required for the VCM 15 to generate a torque $T_{VCMi}$ indicated by $T_{UNi}$. Accordingly, with reference to the voltage table 190 in accordance with the environmental temperature of the hard disk drive, the CPU 18 can determine a power supply voltage (driving voltage) for the VCM driver 172 which is suitable for the temperature range $TR_i$ to which the temperature T belongs. The voltage $E_i$ enables the VCM 15 to generate a torque $T_{UNi}$ required for a head unload operation within the temperature range $TR_i$ to which the temperature T belongs.

To allow the reader to easily understand the relationship between the temperature $T_i$ and the torque $T_{UNi}$ and the VCM current $I_{VCMi}$ and the voltage $E_i$, the voltage table 190 in FIG. 2 shows not only the voltage $E_i$ but also the torque $T_{UNi}$ and the VCM current $I_{VCMi}$ for each temperature $T_i$. Information on both torque $T_{UNi}$ and VCM current $I_{VCMi}$ need not be retained in the voltage table 190.

In the example of the voltage table 190 shown in FIG. 2, the torques $T_{UN1}$ to $T_{UNn}$ have a relationship $T_{UN1}>T_{UN2}>T_{UN3}> \ldots >T_{UNn}$. Similarly, the VCM currents $I_{VCM1}$ to $I_{VCMn}$ have a relationship $I_{VCM1}>I_{VCM2}>I_{VCM3}> \ldots >I_{VCMn}$. Further, the voltages $E_1$ to $E_n$ have a relationship $E_1>E_2>E_3> \ldots >E_n$.

The temperature sensor 20 is used to detect (measure) the environmental temperature of the hard disk drive. On the basis of the temperature detected by the temperature sensor 20 and the voltage table 190, the CPU 18 determines a power supply voltage for the driver IC 17 which is suitable for that temperature. The CPU 18 outputs a voltage control signal VC to the voltage booster 174, the signal VC designating the voltage to be boosted to the determined voltage.

The CPU 18 controls each section of the hard disk drive in accordance with the control program stored in the flash ROM 19. In particular, the CPU 18 controls the voltage selector 175 using a voltage selection signal VS. The voltage selection signal VS specifies, for example, selection of a voltage $E_B$ for logical "1" and of a voltage $E_{HDD}$ for logical "0". In FIG. 1, well-known circuits are omitted which are required to read and write data from and to the disk 11. As these circuits, a disk controller, a read/write channel, and a head amplifier circuit (head IC) are well known.

Figure 3:
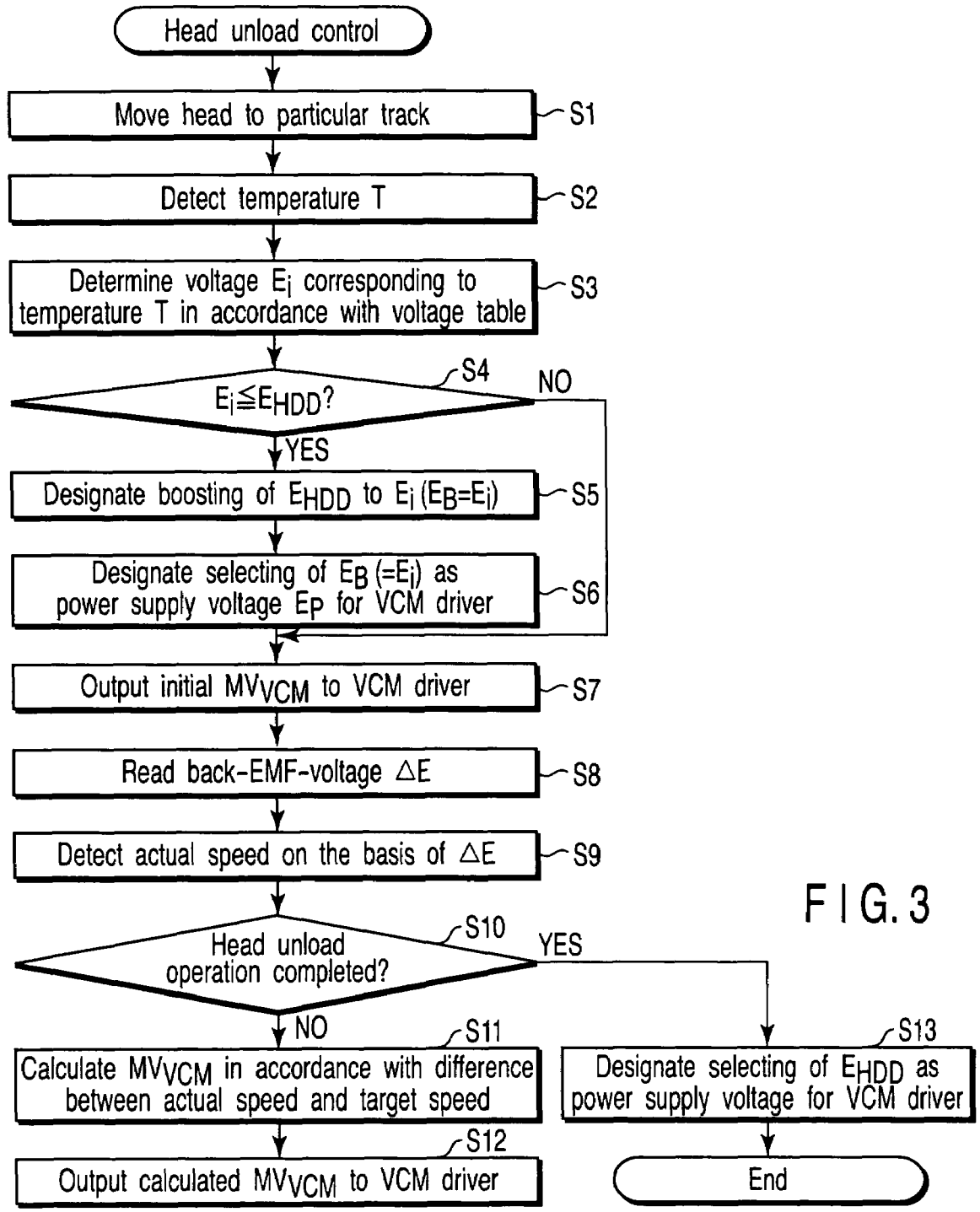
FIG. 3 is a flowchart showing a procedure of head unload control according to the embodiment.

Now, with reference to the flowchart in FIG. 3, description will be given of the control of an head unload operation performed on the hard disk drive shown in FIG. 1. The hard disk drive is assumed to be in the second mode. In this mode, the disk 11 is rotated by the SPM 13 at a predetermined rotation speed. On this occasion, the head 12 floats over the disk 11 while maintaining an almost fixed distance from the disk 11. In this state, the CPU 18 is assumed to switch from the second mode to the first mode. Switching to the second mode is autonomously carried out by the CPU 18 if a host has not provided a read or write command for a specific period in the second mode, in order to save the power consumption of the hard disk drive. Further, if the host computer has provided a certain power save command in the second mode, the CPU 18 switches to the first mode in response to this command.

To switch to the first mode, the CPU 18 performs control for unloading (retracting) the head 12 on the ramp 16 (control of a head unload operation) as described below. First, the CPU 18 controls a seek operation for moving the head 12 to a particular track on the disk 11 (step S1). The seek operation is controlled on the basis of positional information contained in servo information read by the head 12 from the disk 11. Thus, at the start of control of a head unload operation, the CPU 18 moves the head 12 to the particular track. This makes it possible to maintain a moving distance required to unload the head 12 on the ramp 16 at a fixed value. In this case, the particular track is a track close to the ramp 16, that is, a predetermined track closer to the outer periphery of the disk 11.

Then, the CPU 18 detects the temperature T of the hard disk drive on the basis of an output voltage from the temperature sensor 20 (step S2). Then, the CPU 18 reads (determines), from the voltage table 190, the voltage $E_i$ corresponding to the temperature range $TR_i$ (that is, $T_{i-1} < T \leq T_i$) to which the temperature T belongs (step S3). The CPU 18 compares the voltage $E_i$ with the power supply voltage $E_{HDD}$ for the hard disk drive to determine whether or not $Ei > E_{HDD}$ (step S4). If $E_i > E_{HDD}$, the CPU 18 instructs the voltage booster 174 to boost the power supply voltage $E_{HDD}$ to the voltage $E_i$ (step S5). The voltage control signal VC is used for this instruction. In response to this instruction, the voltage booster 174 boosts the power supply voltage $E_{HDD}$ to the voltage $E_i$. The voltage $E_{HDD}$ boosted by the voltage booster 174 to the voltage $E_i$, that is, the voltage $E_B$, is applied to the back-EMF-voltage monitor 173 as a power supply voltage for the back-EMF-voltage monitor 173. Further, the voltage $E_B$ ($E_B > E_{HDD}$) is applied to an input terminal B of the voltage selector 175. The power supply voltage $E_{HDD}$ is applied to an input terminal A of the voltage selector 175.

When the determination is made in step S4, the CPU 18 has instructed the voltage selector 175 to select the power supply voltage $E_{HDD}$, applied to the input terminal A. The voltage selection signal VS for logical "0" is used for this instruction. If it is determined in step S4 that $E_i > E_{HDD}$ as in the case of the above example, the CPU 18 executes step S5 and then proceeds to step S6. In step S6, the CPU 18 switches the voltage selection signal VS to logical "1". That is, the CPU 18 instructs the voltage selector 175 to select the voltage $E_B$ (=$E_i$), applied by the voltage booster 174 to the input terminal B.

The voltage selector 175 selects the voltage $E_B$ in accordance with the instruction from the CPU 18. The voltage $E_B$, selected by the voltage selector 175, is applied to the VCM driver 172 as a power supply voltage (driving voltage) $E_P$ for the VCM driver 172. Thus, the VCM driver 172 is driven by the power supply voltage $E_P$ (=$E_B$=$E_i$), which is higher than $E_{HDD}$. In this manner, if $E_i > E_{HDD}$, the VCM driver 172 is driven by the power supply voltage $E_P$ (=$E_B$=$E_i$), which is higher than $E_{HDD}$. Here, $E_i$ denotes the power supply voltage (driving voltage) for the VCM driver 172 which is determined on the basis of the torque $TUNi$ required for a head unload operation at the current temperature T. Driven by the voltage $E_i$, the VCM driver 172 can output a VCM current $I_{VCMi}$ required by the VCM 15 to generate a torque $T_{VCMi}$ indicated by $T_{UNi}$.

Then, the CPU 18 outputs a predetermined initial manipulated variable $MV_{VCM}$ to the VCM driver 172 (step S7). The initial manipulated variable $MV_{VCM}$ indicates the initial VCM current $I_{VCM}$ required to move the actuator 14 at a target speed in order to unload the head. If $E_i > E_{HDD}$, the VCM driver 172 is driven by the power supply voltage $E_P$ (=$E_B$=$E_i$), which is higher than $E_{HDD}$. Consequently, the VCM driver 172 can supply the VCM current $I_{VCM}$ to the voice coil 150 of the VCM 15 even if the VCM current $I_{VCM}$ determined by the manipulated variable $MV_{VCM}$ from the CPU 18 is larger than that used during a seek operation. In other words, in the present embodiment, for a head load operation at the temperature T at which a torque larger than that needed for a seek operation is required, the required torque can be generated without changing the design of the VCM 15. The VCM 15 drives the actuator 14 using the VCM current $I_{VCM}$, supplied by the VCM driver 172. This starts a head unload operation.

The back-EMF-voltage monitor 173 is driven by the power supply voltage $E_B$ ($E_B > E_{HDD}$) boosted by the voltage booster 174. Thus, even if the terminal voltage (VCM terminal voltage) $E_{VCM}$, generated between the terminals of the voice coil 150, included in the VCM 15, increases above $E_{HDD}$, the back-EMF-voltage monitor 173 can correctly detects $E_{VCM}$. If the VCM driver 172 is driven by the power supply voltage $E_P$ (=$E_B$=$E_i$), which is higher than $E_{HDD}$, the VCM terminal voltage $E_{VCM}$ is likely to be higher than the power supply voltage $E_{HDD}$ for the hard disk drive. Thus, if $E_{HDD}$ ($E_{HDD} < E_B$) is applied to the back-EMF-voltage monitor 173 as a power supply voltage for the monitor 173, it is difficult for the back-EMF-voltage monitor 173 to correctly detect the VCM terminal voltage $E_{VCM}$. The back-EMF-voltage $\Delta E$, generated by the voice coil 150, cannot be directly detected. Thus, the back-EMF-voltage monitor 173 detects the VCM terminal voltage $E_{VCM}$ and calculates the back-EMF-voltage $\Delta E$ from the voltage $E_{VCM}$ in accordance with equation (5), previously described. That is, the back-EMF-voltage monitor 173 indirectly detects the back-EMF-voltage $\Delta E$. The CPU 18 is notified of the back-EMF-voltage $\Delta E$ detected (calculated) by the back-EMF monitor 173.

The CPU 18 reads the back-EMF-voltage $\Delta E$ transmitted by the back-EMF-voltage monitor 173 (step S8). reading of the back-EMF-voltage $\Delta E$ is carried out at regular sampling intervals until the head unload operation is completed. In other words, the CPU 18 detects the back-EMF-voltage $\Delta E$ at regular sampling intervals. The back-EMF-voltage $\Delta E$ depends on the speed of the VCM 15. The speed of the VCM 15 corresponds to the speed of the actuator 14 (that is, the speed at which the head 12, supported by the actuator 14, is moved), which is driven by the VCM 15. Thus, the CPU 18 detects the speed (actual speed) of the actuator 14 on the basis of the back-EMF-voltage $\Delta E$ (step S9).

Then, the CPU 18 determines whether or not the head unload operation has been completed (step S10). The hard disk drive in FIG. 1 employs a well-known configuration in which once the head 16 reaches a predetermined position on the ramp 16, the actuator 14 is locked by a stopper. With this configuration, even though the VCM driver 172 is supplying a VCM current to the VCM 15, the movement of the actuator 14 is forcibly stopped once the head 12 reaches the predetermined position on the ramp 16. Thus, in step S10, the CPU 18 determines from the detected actual speed whether or not the head 12 has reached the predetermined position on the ramp 16, that is, whether or not the head unload operation has been completed.

If the CPU 18 determines that the head unload operation has not been completed, it calculates the manipulated variable $MV_{VCM}$ in accordance with the difference between the calculated actual speed and the target speed (step S1). The manipulated variable $MV_{VCM}$ indicates the VCM current $I_{VCM}$ required to make the speed of the actuator 14 equal to the target speed. The CPU 18 outputs the calculated manipulated variable $MV_{VCM}$ to the VCM driver 172 (step S12). The VCM driver 172 supplies the voice coil 150 of the VCM 150 with the VCM current $I_{VCM}$ determined by the manipulated variable $MV_{VCM}$ output by the CPU 19. This continues the head unload operation.

The CPU 18 repeats steps S8 to S12 at regular intervals until the head 12 is retracted to the predetermined position on the ramp 16. Once the head 12 is retracted to the predetermined position on the ramp 16, the CPU 18 determines that the head unload operation has been completed (step S10). In this case, the CPU 18 instructs the voltage selector 175 to select the power supply voltage $E_{HDD}$, applied to the input terminal A (step S13), to finish the control of the head unload operation. Thus, after the head unload operation has been finished, the power supply voltage for the VCM driver 172 is returned from the power supply voltage $E_B$ ($E_B > E_{HDD}$), boosted by the voltage booster 174, to the power supply voltage $E_{HDD}$ for the hard disk drive.

In the present embodiment, if a head unload operation requires a higher torque than a seek operation, the required torque is obtained by switching the power supply voltage $E_P$ for the VCM driver 172 from $E_{HDD}$ to $E_B$, which is higher than $E_{HDD}$. That is, in the present embodiment, the higher torque is obtained without changing the design of the VCM 15. Thus, if the actuator 14 must be driven to perform an operation other than the head unload, for example, a seek operation, the VCM driver 172 has only to provide less VCM current to the VCM 15. This makes it possible to prevent an increase in the power consumption of the VCM driver 172 or heating of the VCM driver 172 during the seek operation.

Now, description will be given of an operation performed if $E_i > E_{HDD}$ is not established, that is, if $E_i \leq E_{HDD}$. If $E_i \leq E_{HDD}$ (step S4), the CPU 18 skips steps S5 and S6 to shift to step S7. The subsequent operations are similar to those performed if $E_i > E_{HDD}$ as described above. However, the voltage selection signal VS, output by the CPU 18 to the VCM driver 172, remains in the state of logical "0". In this case, the power supply voltage (driving voltage) for the VCM driver 172 is set equal to the power supply voltage $E_{HDD}$ for the hard disk drive. Thus, in the present embodiment, only a low torque is required to perform a head unload operation. Accordingly, if $E_i \leq E_{HDD}$, the power supply voltage for the VCM driver 172 is set at $E_{HDD}$. This also serves to reduce the power consumption during the head unload operation. When the head unload operation for $E_i \leq E_{HDD}$ is completed (step S10), the CPU 18 executes step S13 to finish the head unload control. However, since the voltage section signal VS maintains logical "0", step S13 is not necessarily required.

[Modification]

Now, a modification of the above embodiment will be described. In the above embodiment, the CPU 18 determines the power supply voltage $E_i$ for the VCM driver 172 in accordance with the temperature range $TR_i$ (i=1, 2, ... n) to which the temperature T of the hard disk drive measured at the start of a head unload operation belongs. The $E_i$ denotes the power supply voltage (driving voltage) for the VCM driver 172 which is required by the VCM 15 to generate a torque $TUN_i$ required for the head unload operation within the temperature range $TR_i$. If the determined voltage $E_i$ is higher than the power supply voltage $E_{HDD}$ for the hard disk drive, the CPU 18 causes the voltage booster 174 to boost the voltage $E_{HDD}$ to the voltage $E_i$. During the head unload operation, the CPU 18 causes the voltage selector 175 to select the output voltage $E_B$ ($=E_i$) of the voltage booster 174 as the power supply voltage $E_P$ for the VCM driver 172.

Thus, during the head unload control according to the present embodiment, the power supply voltage $E_P$ for the VCM driver 172 is switched between multiple stages in accordance with the temperature range $TR_i$ to which the temperature T of the hard disk drive belongs. Thus, in the above embodiment, it is possible to efficiently prevent an increase in the power consumption of the VCM driver 172 during a head unload operation while maintaining the torque required for the head unload operation.

However, in the modification of the above embodiment, the power supply voltage $E_P$ for the VCM driver 172 is switched in accordance with the difference between the temperature T of the hard disk drive and the upper limit temperature $T_k$ at which $E_i > E_{HDD}$. Here, the power supply voltage $E_P$ may be set at the voltage $E_1$ or $E_{HDD}$. Specifically, if the temperature T is equal to or lower than the temperature $T_k$, the power supply voltage $E_P$ may be set at the voltage $E_1$. Otherwise, the supplied power $E_P$ may be set at the voltage $E_{HDD}$. To accomplish this, the voltage booster 174 is configured to always boost the voltage $E_{HDD}$ to the voltage $E_1$. In this case, the CPU 18 need not control the voltage booster 174 using the voltage control signal VC. This simplifies the head unload control. However, the prevention of an increase in power consumption during a head unload operation according to the modification is less effective than that according to of the above embodiment. The flowchart in FIG. 4 shows a procedure of controlling a head unload operation according to the modification. In this modification, the voltage table 190, shown in FIG. 2, is not required. The CPU 18 may activate the voltage booster 174 only during a head unload operation. Alternatively, the CPU 18 may activate the voltage booster 174 only during the head unload operation and if the temperature T is equal to or lower than the temperature $T_k$.

Alternatively, during a head unload operation, the supplied power $E_P$ may always be set at the voltage $E_1$ regardless of the temperature T of the hard disk drive. This configuration can further simplify the head unload control. However, the configuration is not expected to be effective in preventing an increase in the power consumption during the head unload operation. Further, if $T_k$ and $E_1$ vary with hard disk drives, a voltage table may be used which retains $T_k$ and $E_1$ and which corresponds to the voltage table 90. In this case, the CPU 18 must use the voltage control signal VC to instruct the voltage booster 174 to boost the power supply voltage $E_{HDD}$ to the voltage $E_1$, shown in the voltage table. If the hard disk drive has two power supply voltages $E_{HDD}$ and $E_1$, the voltage booster 174 is not required.

In the description of the above embodiment, the present invention is applied to a hard disk drive (HDD) using a magnetic disk as a recording medium. However, the present invention is applicable to a disk drive using a recording medium different from the magnetic disk, for example, a magneto-optical disk drive using a magneto-optical disk, provided that in the disk drive, the head is retracted (unloaded) to a retract area away from the recording surface of the disk.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A disk drive having a head which reads data written on a recording surface of a disk, the disk drive comprising:
   an actuator which supports the head such that the head is movable in a radial direction of the disk, the actuator having a voice coil motor used as a driving source for the actuator;
   a voice coil motor driver which supplies the voice coil motor with a driving current for driving the voice coil motor;
   a voltage booster which boosts a power supply voltage for the disk drive to a certain voltage, the certain voltage being higher than a voltage required for a non-head-unload operation;
   a driver driving unit configured to drive, during a head unload operation, the voice coil motor driver by the certain voltage, the certain voltage serving as a power supply voltage for the voice coil motor driver, the head unload operation using the actuator to retract the head to a retract area away from the recording surface of the disk;
   a voltage monitor configured to detect a back electromotive force voltage generated by the voice coil motor;
   a speed detecting unit configured to detect a moving speed of the head during the head unload operation on the basis of the back electromotive force voltage detected by the voltage monitor;
   a driver control unit which controls the voice coil motor driver such that the voice coil motor driver supplies the voice coil motor with a driving current required to make the moving speed of the head detected by the speed detecting unit equal to a target speed;
   a voltage selector which selects one of the power supply voltage for the disk drive and the certain voltage as the power supply voltage for the voice coil motor driver, wherein the driver driving unit includes a selector control unit which controls the voltage selector, and the selector control unit controls the voltage selector so as to select the certain voltage for the head unload operation and to select the power supply voltage for the disk drive for the non-head-unload operation;
   a temperature sensor which detects an environmental temperature of the disk drive;
   a voltage table which associates the environmental temperature of the disk drive with a driving voltage for the voice coil motor which is required to allow the voice coil motor to generate a torque required for the head unload operation at the environmental temperature; and
   a voltage determining unit configured to determine, using the voltage table, a driving voltage associated with the temperature detected by the temperature sensor when the head unload operation is started;
   and wherein the driver driving unit includes a boost control unit configured to control the voltage booster, and the boost control unit controls the voltage booster such that the voltage booster boosts the power supply voltage for the disk drive to the driving voltage determined by the voltage determining unit.

2. The disk drive according to claim 1, wherein:
   only during the head unload operation and if the voltage determined by the voltage determining unit is higher than the power supply voltage for the disk drive, the boost control unit controls the voltage booster such that the voltage booster boosts the power supply voltage for the disk drive to the driving voltage determined by the voltage determining unit;
   only for the head unload operation and if the driving voltage determined by the voltage determining unit is higher than the power supply voltage for the disk drive, the selector control unit controls the voltage selector so as to select the certain voltage;
   even for the head unload operation, if the voltage determined by the voltage determining unit is not higher than the power supply voltage for the disk drive, the selector control unit controls the voltage selector so as to select the power supply voltage for the disk drive; and
   the selector control unit controls the voltage selector so as to select the power supply voltage for the disk drive, for the non-head-unload operation.

3. A method for controlling a head unload operation, the method being applied to a disk drive having a head which reads data written on a recording surface of a disk, the head unload operation retracting the head to a retract area away from the recording surface of the disk, the method comprising:
   using a voltage monitor to detect a back electromotive force voltage at predetermined sampling intervals during the head unload operation, the back electromotive force voltage being generated by a voice coil motor, the voice coil motor being a driving source for an actuator, the actuator supporting the head such that the head is movable in a radial direction of the disk;
   using a speed detecting unit to detect a moving speed of the head on the basis of the detected back electromotive force voltage;
   using a driver control unit to control the voice coil motor driver such that the voice coil motor driver supplies a driving current to the voice coil motor, the driving current supplied to the voice coil motor being required to make the detected moving speed of the head equal to a target speed;
   using a voltage booster to boost a power supply voltage for the disk drive to a certain voltage, the certain voltage being higher than a voltage required for a non-head-unload operation;
   using a driver driving unit to drive the voice coil motor driver by the certain voltage;
   using a temperature sensor which detects an environmental temperature of the disk drive;
   using a voltage table which associates the environmental temperature of the disk drive with a driving voltage for the voice coil motor which is required to allow the voice coil motor to generate a torque required for the head unload operation at the environmental temperature; and
   using a voltage determining unit configured to determine, using the voltage table, a driving voltage associated with the temperature detected by the temperature sensor when the head unload operation is started;
   and wherein the driver driving unit includes a boost control unit configured to control the voltage booster, and the boost control unit controls the voltage booster such that the voltage booster boosts the power supply voltage for the disk drive to the driving voltage determined by the voltage determining unit.

* * * * *